C. C. PETERSON.
LOCK NUT CONSTRUCTION.
APPLICATION FILED JAN. 28, 1919.

1,301,314.

Patented Apr. 22, 1919.

Inventor
Charles C. Peterson
By Moulton & Livrance
Attorneys.

UNITED STATES PATENT OFFICE.

CHARLES C. PETERSON, OF MUSKEGON, MICHIGAN.

LOCK-NUT CONSTRUCTION.

1,301,314.         Specification of Letters Patent.     Patented Apr. 22, 1919.

Application filed January 28, 1919. Serial No. 273,619.

*To all whom it may concern:*

Be it known that I, CHARLES C. PETERSON, a citizen of the United States of America, residing at Muskegon, in the county of Muskegon and State of Michigan, have invented certain new and useful Improvements in Lock-Nut Construction; and I do hereby declare the following to be a full, clear, and exact description of the invention, such as will enable others skilled in the art to which it appertains to make and use the same.

This invention relates to a lock nut construction and is concerned particularly with a very simple yet effective construction by means of which nuts may be held against loosening when once tightened to place. The invention consists in novel constructions and arrangements of parts for effecting this end as will more fully appear from the following description taken in connection with the accompanying drawing, in which, Figure 1 is a section through a nut equipped with my lock nut construction, and showing the practical use thereof.

Like reference characters refer to like parts in the different views of the drawing.

Figure 1:
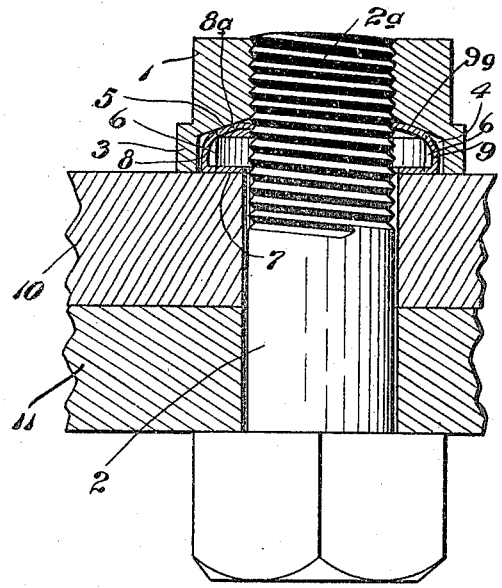
Figure 3:
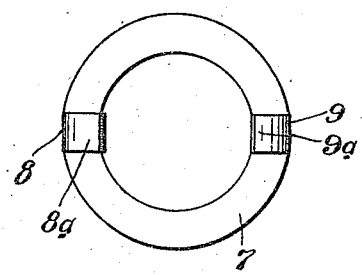
Fig. 3 is a plan of the locking element housed within the nut.
Figure 4:
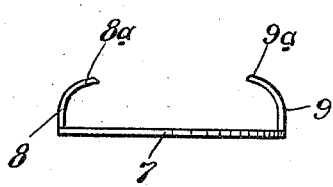
Fig. 4 is a side view thereof.
Figure 2:
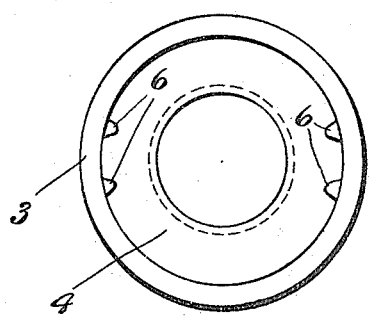
Fig. 2 is a view looking against the under side of the nut.

The nut 1 which is adapted to thread on to the threaded portion 2ª of a bolt 2 has a portion 3 at one end formed with a recess 4 of cylindrical outline, the inner side or boundary of the recess being preferably, formed with an incline as indicated at 5. At opposed sides of the recess two guides 6 are cast integral with the nut as shown, said guides of each pair being parallel to each other.

This recess in the nut is adapted to contain a locking element formed from sheet metal and comprising a flat ring 7 which may pass over the bolt and two opposed upstanding lips 8 and 9 which bend toward each other terminating in thread engaging ends 8ª and 9ª, one of which is located slightly above the other so as to enter threads on opposed sides of the bolt which lie slightly one above the other.

The locking element is housed within the nut when it is threaded onto a bolt, such as 2 and the ring 7 lies against one of the members 10 of the two members 10 and 11 which it may be desired to bind together. As the nut is tightened to place, the inturned ends 8ª and 9ª of the two lips 8 and 9 are brought against the inclined sides 5 of the recess, this causing the ends of said lips to be forced into a groove between two threads on each side of the bolt, biting into the sides of the bolt and tending to hold the nut against movement with respect to the bolt. The guides between which the lips 8 and 9 pass cause the locking element to move with the nut and this is of value in properly seating the ends of the lips between the threads. The tighter the nut is forced, the more firmly the locking element engages with the bolt, and when once tightened to place, there is little or no probability of the nut loosening under vibration, shocks or the like in machinery, vehicles or other devices where bolts and nuts are used to connect various parts together.

This construction of nut lock is simple and inexpensive to manufacture, the nuts being readily formed and the locking element stamped readily from sheet metal. In use the locking element is completely housed and does not show in any respect. In practice the construction has proved particularly efficient for the purposes for which it is designed.

I claim:

1. In combination, a bolt, a nut threaded on to the bolt, said nut having a recess in its inner side and guides projecting into said recess, and a locking element comprising a ring positioned around the bolt and two oppositely positioned outwardly extending lips turned at their ends toward each other, said locking element being located in said recess in the nut and with the lips disposed between the guides, said inturned ends of the lips being adapted to engage with the threaded portion of the bolt, substantially as and for the purposes described.

2. In combination, a nut adapted to thread on to a bolt, said nut in its under side being formed with a recess larger than the cross section of the bolt, and with a pair of guides extending into the recess, and a locking element comprising a ring formed with a central opening to pass the bolt and with opposed upstanding lips turned in toward each other, said locking element being located within the recess with one of said lips positioned between the guides, substantially as and for the purposes described.

3. In combination, a nut adapted to thread on to a bolt, said nut in its under side being formed with an enlarged recess, a locking element comprising a ring formed with a central opening to pass the bolt and two oppositely positioned upstanding lips turned at their ends toward each other, said locking element being located within the recess in the nut, and means on the nut engaging with the locking element to stop relative rotative movement between them, substantially as and for the purposes described.

4. In combination, a bolt, a nut threaded thereon, said nut having an enlarged recess in its under side, a locking element disposed within said recess and around the bolt, said element including oppositely positioned lips turned in from the body of the locking element toward the bolt and adapted to be pressed inwardly against the bolt when the nut is tightened, and means on the nut engaging with the locking element to hold the same against rotative movement with respect to the nut, substantially as and for the purposes described.

In testimony whereof I affix my signature.

CHARLES C. PETERSON.

Copies of this patent may be obtained for five cents each, by addressing the "Commissioner of Patents, Washington, D. C."